(12) United States Patent
Barrett-Bowen et al.

(10) Patent No.: US 9,240,987 B2
(45) Date of Patent: Jan. 19, 2016

(54) SEPARATE PRIVACY SETTING CONTROL OF MULTIPLE COMMUNICATION CLIENTS OF A USER

(71) Applicant: Microsoft Corporation, Redmond, WA (US)

(72) Inventors: Neil Barrett-Bowen, Kingston (GB); Richard James Cole, Shouldham (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 67 days.

(21) Appl. No.: 13/722,974

(22) Filed: Dec. 20, 2012

(65) Prior Publication Data

US 2013/0247151 A1    Sep. 19, 2013

(30) Foreign Application Priority Data

Mar. 16, 2012   (GB) .................................. 1204687.6

(51) Int. Cl.
    *H04L 29/06* (2006.01)
(52) U.S. Cl.
    CPC .............. *H04L 63/08* (2013.01); *H04L 63/104* (2013.01)
(58) Field of Classification Search
    CPC ............................. H04L 63/08; H04L 63/104
    See application file for complete search history.

(56) References Cited

U.S. PATENT DOCUMENTS

2006/0040677 A1*  2/2006  Dietrich et al. ............ 455/456.2
2006/0047748 A1*  3/2006  Kelso et al. ................... 709/204
2007/0077939 A1*  4/2007  Uematsu et al. ........... 455/456.1
2007/0250516 A1* 10/2007  Dahlberg et al. ............... 707/10
2009/0049190 A1*  2/2009  Jiang et al. ..................... 709/238
2010/0191837 A1*  7/2010  Linden et al. .................. 709/220
2010/0257577 A1* 10/2010  Grandison et al. ................ 726/1
2011/0075825 A1*  3/2011  Balasaygun et al. ........ 379/93.17
2011/0138480 A1*  6/2011  Janoulis et al. .................. 726/28
2011/0153781 A1*  6/2011  Srinivas ........................ 709/219
2011/0250874 A1* 10/2011  Shah et al. ..................... 455/415
2012/0131309 A1*  5/2012  Johnson et al. .................. 712/41
2012/0143974 A1*  6/2012  Zhang et al. .................. 709/206
2012/0179549 A1*  7/2012  Sigmund et al. ........... 705/14.58

FOREIGN PATENT DOCUMENTS

| CN | 1625737 | 6/2005 |
|---|---|---|
| CN | 102025648 | 4/2011 |
| WO | WO-2005008524 | 1/2005 |
| WO | WO-2005009019 | 1/2005 |

OTHER PUBLICATIONS

"Foreign Office Action", CN Application No. 201310085280.6, Jun. 26, 2015, 15 Pages.

* cited by examiner

*Primary Examiner* — Matthew Henning
(74) *Attorney, Agent, or Firm* — Jim Ross; Micky Minhas

(57) ABSTRACT

One or more terminals that are coupled to a packet-based network are installed with a first instance and/or a second instance of a communication client application of a first user. At times, the communication client application can be configured to enable the first user to communicate with other users using a first communication system implemented over the packet-based network. In some cases, a controller coupled to the packet-based network can be used to maintain separate privacy settings for each of the first and second instances, and thereby control the privacy of the first user in relation to the other users within the first communication system in dependence on which of the first and second instances is active.

20 Claims, 9 Drawing Sheets

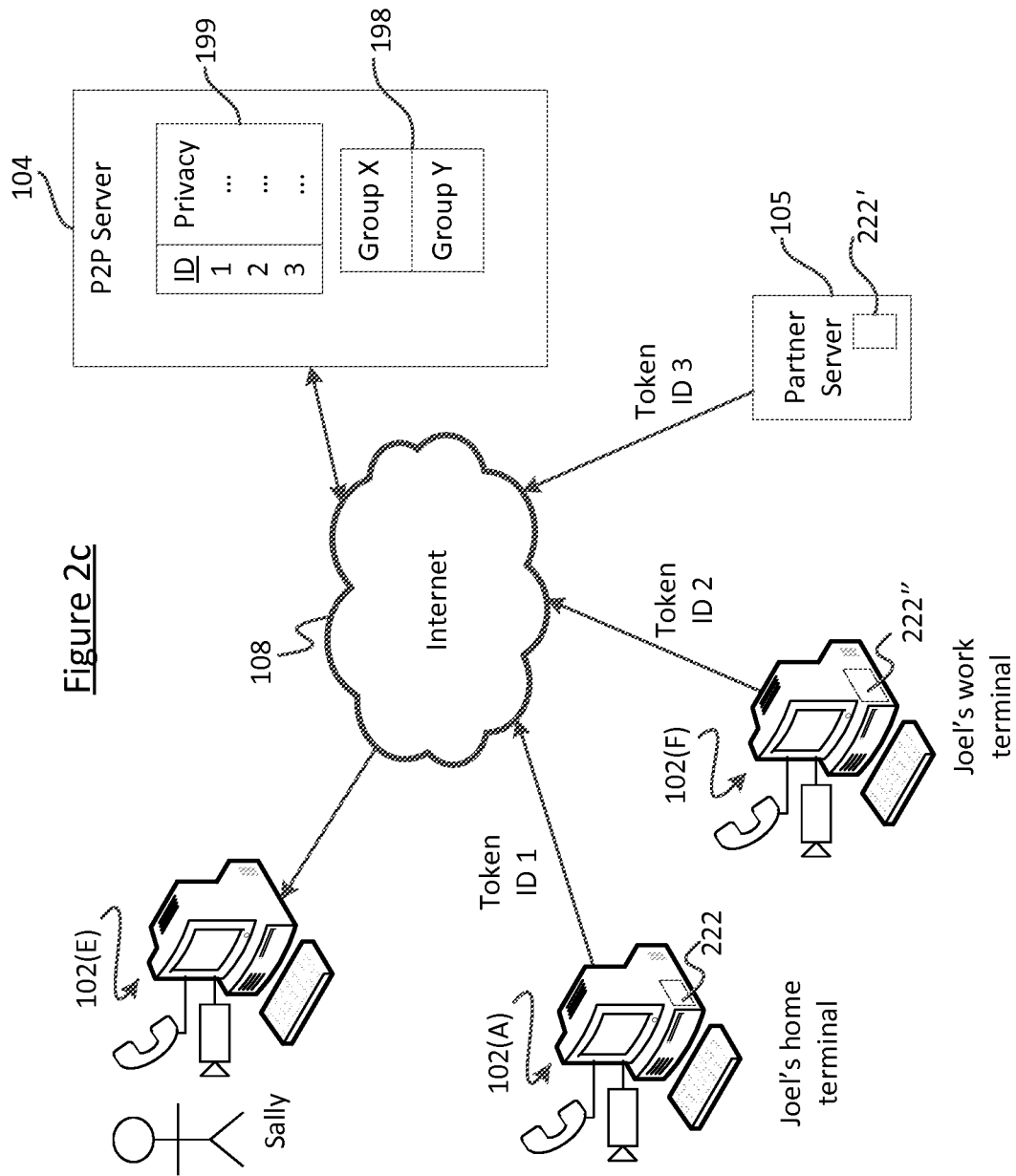

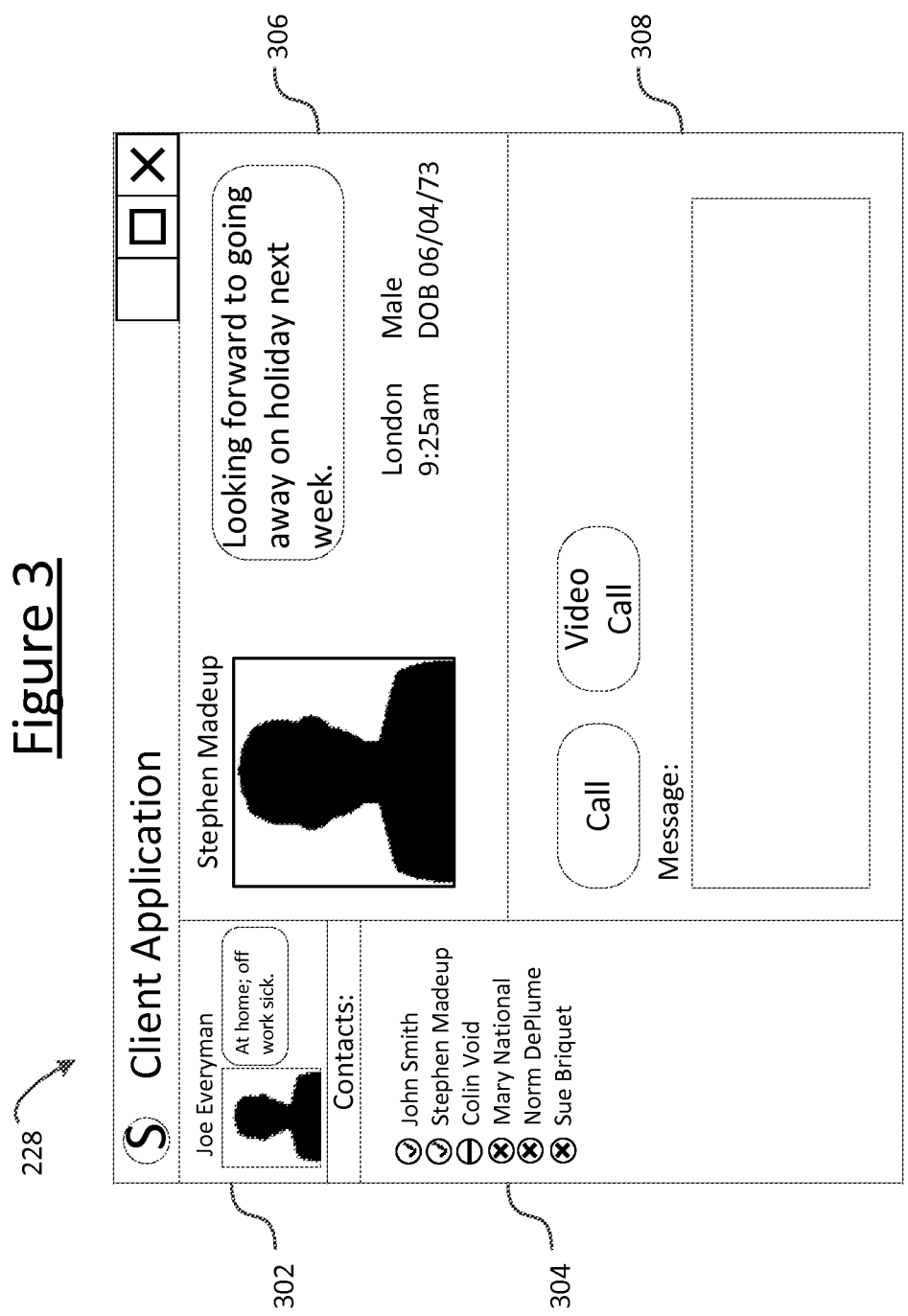

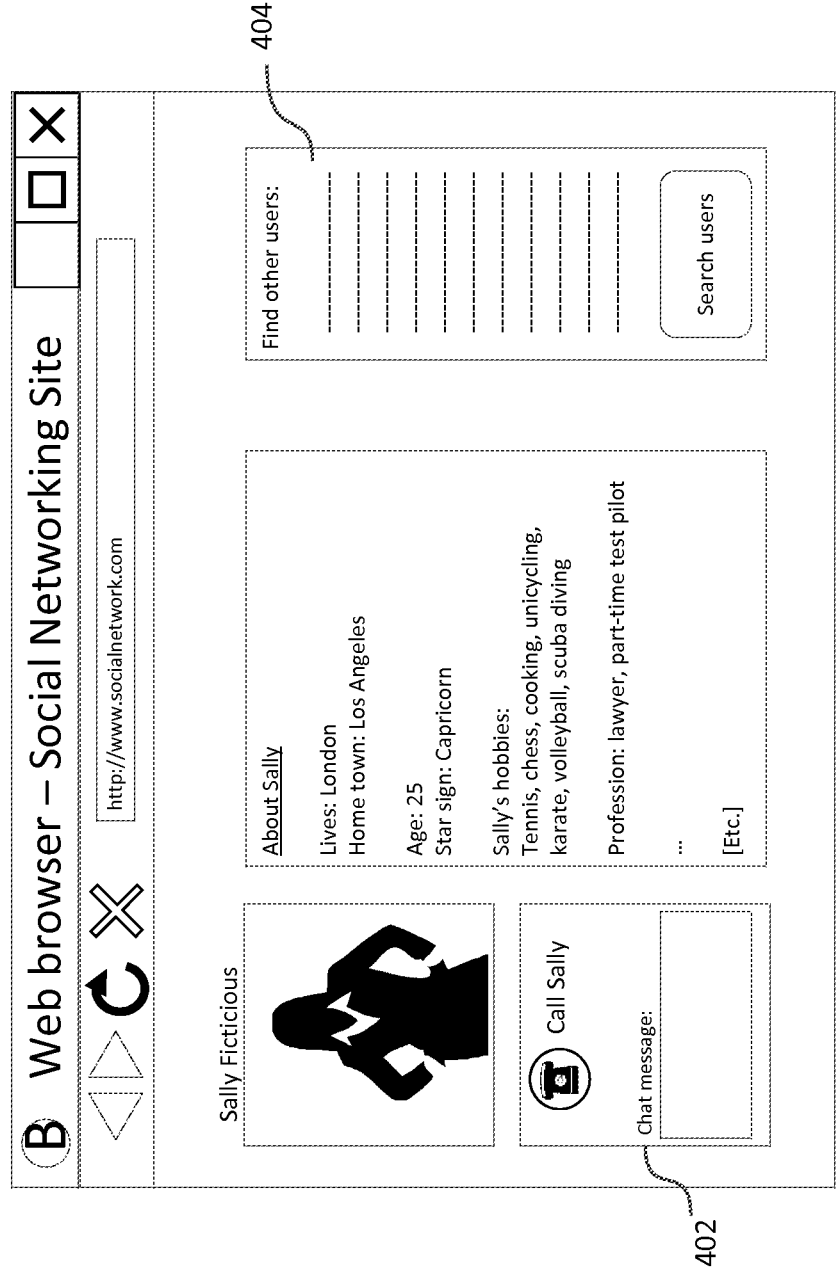

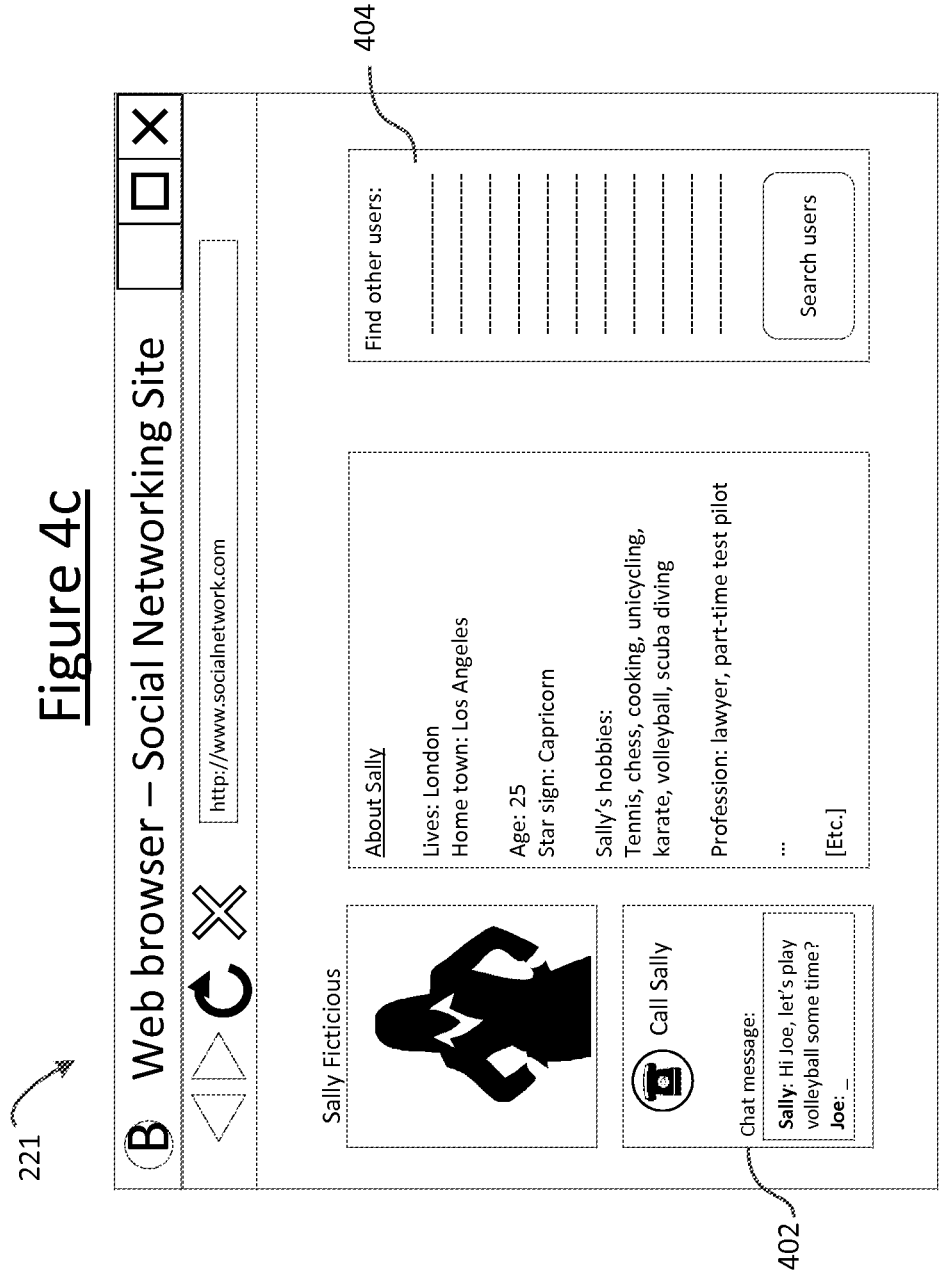

Figure 5

Privacy Settings

Allow calls from...
○ Anyone
◉ People in my contact list only

Automatically receive video calls from
○ anyone
◉ only people in my contact list
○ no one

Allow IMs from...
◉ anyone
○ people in my contact list only

☐ Allow my online status to be shown on the web (Learn more)
☑ Accept Skype browser cookies (Lean more)

Keep history for
[ Forever ⋁ ]  ( Clear History )

( Clear Skype cookies )

( Show Basic Options )

500

SEPARATE PRIVACY SETTING CONTROL OF MULTIPLE COMMUNICATION CLIENTS OF A USER

RELATED APPLICATION

This application claims priority under 35 USC 119 or 365 to Great Britain Application No. 1204687.6 filed Mar. 16, 2012, the disclosure of which is incorporated in its entirety.

BACKGROUND

Some communication systems allow the user of a device, such as a personal computer, to communicate across a packet-based computer network such as the Internet. Such communication systems include voice over internet protocol ("VoIP") systems. These systems are beneficial to the user as they are often of significantly lower cost than conventional fixed line or mobile networks. This may particularly be the case for long-distance communication. To use a VoIP system, the user installs and executes client software on their device. The client software provides the VoIP connections as well as other functions such as registration and authentication. In addition to voice communication, the client may also provide other communication media such as video calling, instant messaging ("IM"), SMS messaging, file transfer and voicemail.

One type of communication system for packet-based communication uses a peer-to-peer ("P2P") topology. To enable access to a peer-to-peer system, a user must execute P2P client software provided by a P2P software provider on their computer, and register with the P2P system to obtain a digital certificate. Calls or other communications can subsequently be set up and routed between users of the P2P system without the further use of a server in the set-up. Instead, the client looks up the required IP addresses from information distributed amongst the P2P client software on other end users' computers within the P2P system, and the caller's P2P client software then exchanges certificates with the callee's P2P client software.

VoIP or other packet-based communications can also be implemented using non-P2P systems that do use centralized call set-up and/or authorisation, e.g. via server. In this case the client installed and executed on the user's computer is an application that accesses a server so that call signalling can be handled by the server. In certain situations a server based architecture may be increasingly desirable over a P2P topology.

Whatever architecture or topology is used, there is an increasing demand to integrate such packet-based communication systems into other partner communication systems or "partner platforms", for example to integrate a VoIP system into a social networking site. However, although the user may only see this as a new user-interface for accessing the VoIP communications or such like, there are in fact a number of technical challenges involved in adapting the underlying system architecture to accommodate the partnership. One such challenge is ensuring an adequate degree of privacy when the user-bases of the two systems are to be merged. Generally speaking, privacy within a packet-based communication can be a concern in other situations as well.

SUMMARY

According to one or more embodiments, there is provided a communication apparatus comprising one or more terminals coupled to a packet-based network such as the Internet. The apparatus is installed with a first instance of a communication client application of a first user and a second instance of the communication client application of said first user. For example the communication client could be a VoIP client and/or IM client. The communication client application is configured so as when executed to enable the first user to communicate with other users by means of a first communication system implemented over the packet-based network. The communication apparatus also comprises a controller coupled to the packet-based network and arranged to maintain separate privacy settings for each of the first and second instances of the client. For example, the privacy settings may determine whether or not the other users can contact the first user. As another example, the privacy settings may determine what information about the first user is made available to the other users.

The controller thereby controls the privacy of the first user in relation to the other users within the first communication system in dependence on which of the first and second instances is active.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

BRIEF DESCRIPTION OF THE DRAWINGS

For a better understanding of the present disclosure and to show how it may be carried into effect, reference will now be made by way of example to the accompanying drawings in which:

FIG. 2c is a schematic representation of a part of the network of FIG. 1;

FIG. 3 is a schematic representation of a VoIP client application user interface viewed on a user terminal;

FIG. 4a is a schematic representation of a partner system user interface viewed through a web client application on a user terminal;

FIG. 4c is a further representation of a partner system user interface viewed through a web client application on a user terminal;

FIG. 5 is a schematic representation of privacy setting controls as accessed via the user interface of the VoIP client application.

DETAILED DESCRIPTION

Figure 1:
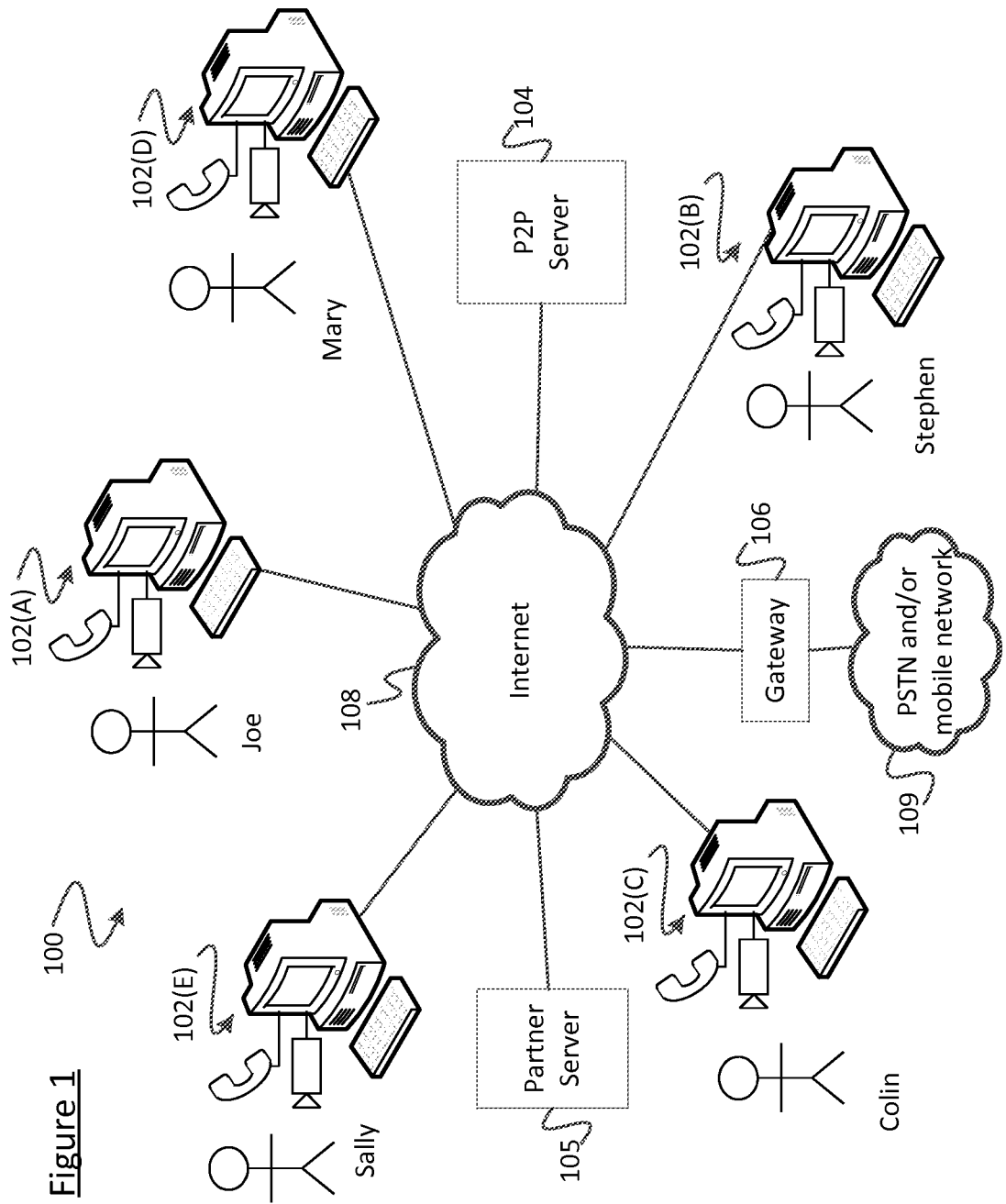
FIG. 1 is a schematic representation of a packet-based network such as the Internet.

FIG. 1 is a schematic illustration of a packet-based network such as the Internet, which comprises a plurality of interconnected elements such as those labelled 102, 104, 105 and 106. Each network element is inter-coupled with the rest of the Internet 108, and is configured to communicate data with other such elements over the Internet by transmitting and receiving data in the form of Internet Protocol (IP) packets. Each element also has an associated IP address locating it within the Internet. The elements shown explicitly in FIG. 1 are: a plurality of end-user terminals 102(A) to 102(E) such as desktop or laptop PCs or Internet-enabled mobile phones; one or more VoIP provider servers 104 for implementing a VoIP communication system; one or more web servers 105; and a gateway 106 to another type of network 109 such as to a traditional Public-Switched Telephone Network (PSTN) or other circuit switched network, and/or to a mobile cellular network. However, it will of course be appreciated that many more elements make up the Internet than those explicitly shown. This is represented schematically in FIG. 1 by a communications cloud 108 which will include many other end-user terminals, servers and gateways, as well as routers of Internet service providers (ISPs) and Internet backbone routers.

The embodiments described herein can be implemented in connection with any suitable hardware, software, firmware or combination thereof. In at least some instances, embodiments can be implemented in the form of computer-readable instructions stored on a computer-readable storage medium. As used herein, "computer-readable storage medium" is intended to refer to all statutory forms of storage media. As such, "computer-readable storage medium" is not intended to cover non-statutory subject matter such as carrier waves or signals per se.

Each of a plurality of the end-user terminals 102 is installed with communication software in the form of a communication client application. In embodiments the communication client application comprises a VoIP client application, and the exemplified embodiments will be described in relation to a VoIP client, but it will be appreciated that the ideas set out herein could also apply to a client application having alternative or additional communication functionality such as IM chat messaging or file transfer.

When executed, the VoIP client application allows the end-user terminals 102 to establish bidirectional communication channels with other such end-user terminals 102 via the Internet, using either server based or P2P call set-up (or more generally connection set-up). The VoIP client applications may also share presence information with one another, either directly or via a server 104, which provides an availability status of users. The presence information for each user may be at least in part defined by the user themselves. The VoIP client application may also retrieve some additional information from the VoIP provider's server 104, such as contact lists which provide the names and user IDs of the users' contacts, "avatars" which are images chosen by users to represent themselves within the VoIP system.

Each of the end-user terminals 102 is also installed with document-browser client software, in embodiments in the form of a web browser. When executed, this allows the user terminals 102 to retrieve information in the form of web pages and any related data from web servers coupled to the Internet 108, and to display such information on their screens under control of the user. The web browser may also enable the user to submit data from their terminal 102 to a web server, which may for example store the information for access by other network elements such as user terminals 102 and/or operate on the submitted data to generate a response or send a message to other network elements.

According to embodiments, such web servers include one or more partner servers 105 which operate a partner communication system accessible via the web browsers of the user terminals 102. The partner communication system provides an additional communication medium in conjunction with the VoIP communication system. For example, the partner server(s) may host a social networking site in the form of web pages plus related data and data processing software, in which case the additional medium may comprise the posting of static or interactive user profiles provided in conjunction with the VoIP, video calling and/or IM provided by the VoIP (or IM) communications system. In embodiments the partner system is a partner to the VoIP system in that it's front-end or user interface also provides access to the VoIP system. This may be achieved by means of an alternative instance of the VoIP client application installed at one or more of the partner servers 105, which users can access via the partner site instead of using the local VoIP client installed on their local user terminal 102. An example implementation of this is discussed in more detail below in relation to FIGS. 2b and 2c.

There may also be a VoIP client application installed at one or more gateways 106 coupled to both the Internet 108 and one or more other networks 109 such as a PSTN network and/or a mobile cellular network. This allows the VoIP client applications running on end-user terminals 102 to communicate with ordinary land-line telephones and/or mobile telephones respectively, even if those telephones themselves do not run VoIP client applications and are not directly coupled to the Internet. In that case, the VoIP client application on the terminal 102 sets up a connection over the Internet with the VoIP client application on the gateway 106 using server-based or P2P call set-up and provides it with a phone number, and the gateway 106 uses the phone number to set up a connection with the telephone over the respective other network. Or in the other direction, a telephone user may dial into the gateway 106 with a number that identifies the user within the VoIP system, and the gateway 106 will set up a connection with that user's terminal 102 over the Internet. In either case, a bidirectional communication channel can thus be established via the Internet and PSTN or mobile cellular network.

Figure 2A:
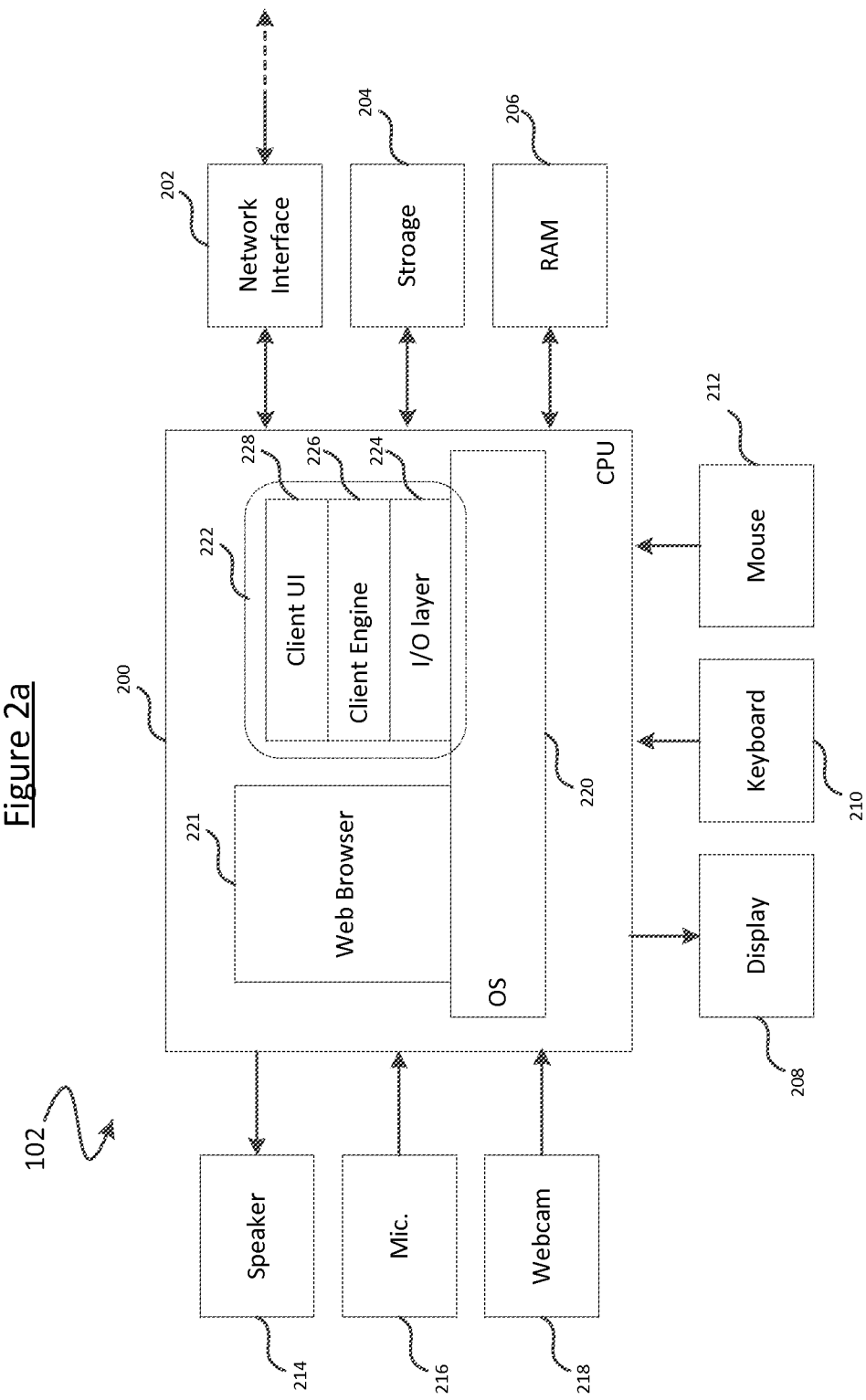
FIG. 2a is a schematic block diagram of a user terminal installed with a web-client application and VoIP client application.

The schematic block diagram of FIG. 2a shows an example of an end-user terminal 102, which is configured to act as a terminal of a VoIP system operating over the Internet. The terminal 102 comprises a processor or CPU 200 operatively coupled to: a network interface 202 such as modem for connecting to the Internet 108, a non-volatile storage device 204 such as a hard-drive or flash memory, and a volatile memory device such as a random access memory (RAM) 206. The terminal 102 also comprises one or more user input devices, for example in the form of a keyboard 210, mouse 208, microphone 216 and webcam 218, each operatively coupled to the CPU 200. The terminal 102 further comprises one or more user output devices, for example in the form of a display screen 208 and speaker 214, again each operatively coupled to the CPU 200.

The storage device 204 stores software including at least an operating system (OS) 220, a document-browser client application in the form of a web browser 221, and packet-based communication software in the form of a VoIP client application 222. On start-up or reset of the terminal 102, the operating system software 220 is automatically loaded into the RAM 206 and from there is run by being executed on the CPU 200. Once running, the operating system 220 can then run applications such as the web client application 221 and VoIP client application 222 by loading them into the into the RAM 206 and executing them on the CPU 200. To represent this schematically in FIG. 2, the operating system 220, web client application 221 and VoIP client application 222 are shown within the CPU 200.

The VoIP client application 222 comprises a "stack" having three basic layers: an input and output (I/O) layer 224, a client engine layer 226, and a user interface (UI) layer 228. Each layer is responsible for specific functions. Because each successive layer usually communicates with two adjacent layers (or one in the case of the top layer), they are regarded as being arranged in a stack as shown in FIG. 2a. The web client application 221 and VoIP client application 222 are said to be run "on" the operating system 220. This means that in a multi-tasking environment they are scheduled for execution by the operating system 220; and further that inputs to the web client application 221 and the lowest (I/O) layer 224 of the VoIP client application 222 from the input devices 202, 216 and 218 as well as outputs from web client application 221 and the I/O layer 224 of the VoIP client application 222 to the output devices 202, 208 and 214 may be mediated via suitable drivers and/or APIs of the operating system 220.

The I/O layer 224 of the VoIP client application comprises audio and/or video codecs which receive incoming encoded streams and decodes them for output to speaker 214 and/or display 208 as appropriate, and which receive unencoded audio and/or video data from the microphone 216 and/or webcam 218 and encodes them for transmission as streams to other end-user terminals 102 of the VoIP system. The I/O layer 224 may also comprises a control signalling protocol for signalling control information between terminals 102 of the network.

The client engine 226 then handles the connection management functions of the VoIP system as discussed above, such as establishing calls or other connections by server-based or P2P address look-up and authentication. The client engine may also be responsible for other secondary functions of the VoIP system such as supplying up-to-date contact lists and/or avatar images of the user to the VoIP system server 104; or retrieving up-to-date contact lists of the user and retrieving up-to-date avatar images of other users from the VoIP server 104. Further, the client engine may retrieve presence information from the other clients of the users in the contact list via a public API, and reciprocally provide its own presence information to those other clients that are online. Exchange of presence information directly between clients via a public API is one option, but alternatively the presence information could be exchanged via an intermediate node such as a server 104.

The UI layer 228 is responsible for presenting decoded video to the user via the display 208, for how to arrange the presented output on the display 208 along with user controls such as buttons and menus, and for receiving inputs from the user via the presented controls.

FIG. 3 illustrates schematically an example user interface 228 as would be presented to a user on the display 208 when the VoIP client application 222 is open for viewing by the user. In this example, the user interface 228 is that of the VoIP client application 222 running on a first user terminal 102(A). The user interface is divided into a number of panels. A first panel 302 displays some details of the user's own profile, in this example the user's name "Joe Everyman", an avatar image, and a "mood message". These details may be stored at and retrieved from the VoIP system's server 104 by the client engine 226, so as to be made available to other users of the VoIP system. The avatar image is an image chosen by the user to represent themselves to other users (which need not necessarily be a photo of themselves). The mood message is a brief user-defined statement which can be used for any purpose but is typically used to express how the user is feeling, news about recent events in the user's life, or any upcoming plans that may affect the user's availability (the mood message may therefore in some cases be considered a type of presence information). When other users view Joe's profile in their own clients, these details will be visible to them via the VoIP server 104, and vice versa the other users' details will be made available to Joe's client (if they are in each others' contact lists).

A second panel 304 of the user interface 228 displays a contact list of the user's friends or associates, these being other users of the VoIP network. Entry in the contact list may be conditional on mutual agreement from the users. The contact list may be stored at and retrieved from the VoIP system's server 104 by the client engine 226, so that the same list is available to the user uses different instances of the VoIP client application on different terminals. Presence information is also displayed in the panel next to each contact. The presence information represents an availability status which may comprise an indication of whether the user is online, and may in part be user-defined. For example, the presence status may be: the user is offline (x), the user is online and has selected to be shown as available (√), or the user is online but has selected to be shown as not available (–).

A third panel 306 of the user interface 228 displays the profile of a selected user from the contact list, in this case "Stephen Madeup", a user of another user terminal 102(B). The displayed profile includes Stephen's name, avatar image and mood message, along with other details Stephen may have supplied to the VoIP server 104 such as current location, local time, gender and date of birth (DOB). These profile details are retrieved from the VoIP server 104 by the client engine 226.

A fourth panel 308 of the user interface 228 then displays communication controls in relation to the selected contact, such as buttons allowing a voice or video call to be established, and a window for entering chat messages. Any incoming chat messages and chat history will be displayed in this panel also, and file transfers may be established by dragging-and-dropping files into the chat window.

Figure 2B:
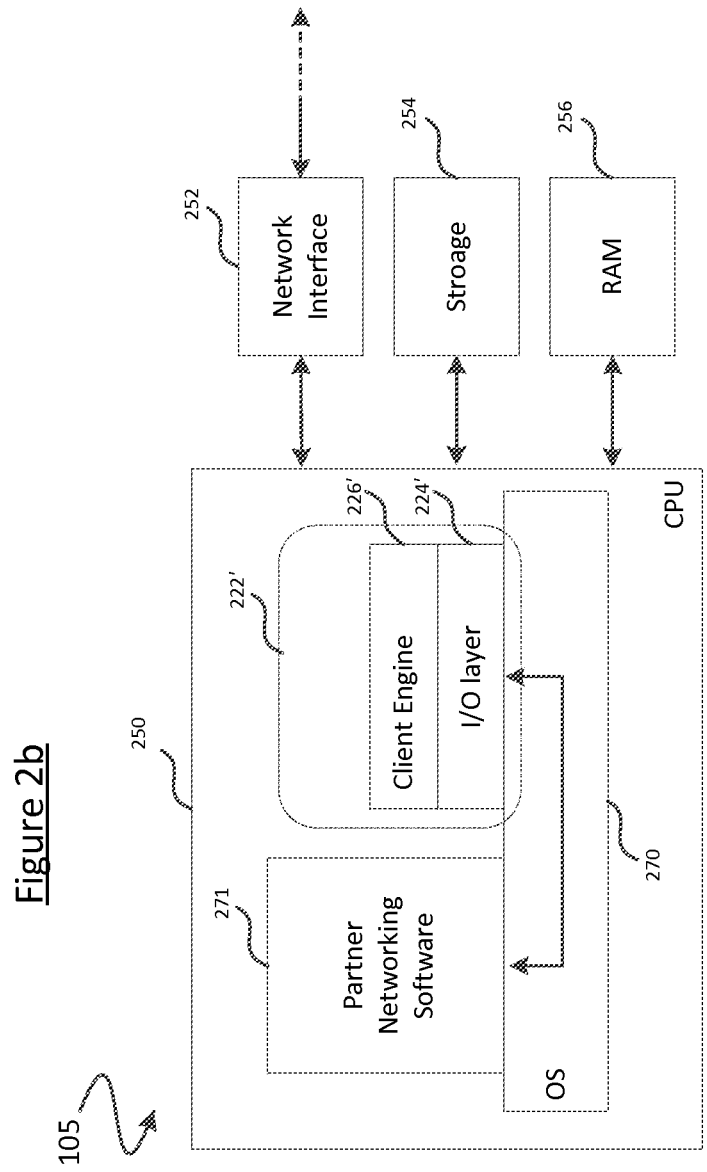
FIG. 2b is a schematic block diagram of a partner server hosting a social networking site and VoIP client application.

A schematic representation of the partner server 105 is now shown in FIG. 2b. The partner server 105 comprises a processor or CPU 250 operatively coupled to: a network interface 252 such as modem for connecting to the Internet 108, a non-volatile storage device 254, and a volatile memory device such as a random access memory (RAM) 256. There could also be one or more user input or output devices for the server 105, but these are not shown.

The storage device 254 stores software including at least an operating system (OS) 270, partner software 271 e.g. in the form of a social networking site, and an alternative "partner" instance of the VoIP client application 222' similar to the "main" or "local" instance 222 installed on the user terminal 102. The partner software 271 and partner VoIP client instance 222' are both run on the OS 270. The partner software 271 provides the core functionality of the partner communication system, e.g. by supplying the social networking pages and related data to user terminals 102 over the Internet 108 and receiving and processing related data and requests from those user terminals 102. The social networking web pages provide a front-end or user interface for the partner communication system, and in embodiments this partner user interface also includes one or more controls which can control the partner instance of the VoIP client application 222' (e.g. via the OS 270) and thereby provide an alternative means of access to the VoIP communication system via the front-end of the partner communication system, instead of via the main instance 222 run on the user's local user terminal 102. Note that the partner instance of the client 222' need not necessarily have a UI layer if the user interface is to be provided by the partner's front-end, although the possibility that some UI elements could be provided from a UI layer of the client 222' is not excluded.

In another arrangement, as an alternative to (or in addition to) a partner instance of the VoIP client 222' being implemented at a partner server 105, the user may have two or more different instances of the VoIP client installed on two or more different respective end-user terminals 102, e.g. one instance of the VoIP client installed on a personal terminal such as the user's own home computer or mobile phone, and another instance of the VoIP client installed on a work terminal such as a work laptop or smartphone allocated to the user by his or her employer. For example at least one of the multiple instances on the different terminals 102 such as the instance installed on the personal terminal may be configured to enable access the VoIP communications system via the partner networking software 271 on the partner server 105 as an alternative means of access, e.g. via the social networking site (as well as allowing the regular means of access); whereas at least one of the other instances such as the instance on the work terminal may not be intended for accessing VoIP or other communications via the partner system (either because the user refrains from doing do or because that functionality is not provided or disabled on the work based instance).

In yet another arrangement as an alternative or in addition to either or both of the above, the user may have two different instances of the VoIP client installed on the same end-user terminal 102. In this case the user may have one instance of the VoIP client on the user terminal 102 which is configured to enable access the VoIP communications system via the partner networking software 271 on the partner server 105, e.g. via the social networking site; whereas the other instance on the same user terminal 102 is configured to access the VoIP communications via the regular means, i.e. directly via the VoIP provider's server 104 and/or by P2P techniques without involvement of the partner 105. In some embodiments one or both of the two instances may be set or configured exclusively to allow access to the VoIP communications by their respective means, i.e. one allowing access to VoIP only via the partner system 105 and/or one allowing access to VoIP only directly via the VoIP provider's server 104 or P2P without involvement of the partner 105. However, in alternative embodiments each instance could be able to allow access via both means, and simply maintained by the user on the same terminal for different purposes.

A situation involving the user of a first terminal 102(A) and a user of another terminal 102(E) is illustrated schematically in FIG. 2c. FIG. 2c also illustrates the possibility that the same user has two different terminals 102(A) and 102(F) each installed with a separate instance 222 and 222" of the VoIP client application of that user, and the possibility that the user has two different instances of the VoIP client 222 and 222''' installed on the same user terminal 102(A).

As an example of the operation of the above, consider a situation where the user of the first terminal 102(A) accesses a page of the social networking site which includes profiles or other information about other users. In response to detecting this, the partner software 271 may consult a look-up table mapping the IDs of the VoIP system to identifiers identifying users of the partner system. The look-up table could be stored on either the VoIP provider's server(s) 104 or partner server(s) 105. If a match is found, that means the profile of the user being viewed on the partner system's site is also a user of the VoIP system, and upon detecting such a match the partner software 271 may insert an associated control such as a clickable call icon or IM chat-bar into the page being viewed on the terminal 102(A). Alternatively, this functionality could be implemented locally at the user terminal 102(A) by means of the web browser 221, the local instance of the client 222 and/or a toolbar application that mediates between the two (not shown). Also, if implemented locally, the look-up could be performed using a local look-up table stored on the user terminal 102(A) listing contacts who are known to be users of both the VoIP and partner systems, rather than a look-up table stored remotely on a server 104 or 105.

FIG. 4a is a schematic illustration of a user interface of the web browser 221 displaying an example social networking site, with integrated VoIP (and/or IM) controls 402 inserted in association with the profile of an example user "Sally Fictitious" of the user terminal 102(E) within the partner system.

The user of the first user terminal 102(A) may then interact with an inserted control 402 to initiate a communication connection such as a VoIP call, video call or IM chat session with the matched user, in this example the user of user terminal 102(E). This therefore provides an alternative means of access to the VoIP (or IM) communication system via the partner instance 222' run on the partner server 105, rather than using the local instance 222 run on the user terminal 102(A) of the initiating user. For convenience the initiating user may be referred to herein as the calling user or caller and the user with whom communications are being initiated may be referred to as the called user or callee, but it will be understood that other types of communication than voice or video calls are intended to be covered, e.g. IM messages, voice mail or file transfer.

In response to the user interaction, the browser 221 running on the caller's terminal 102 signals to the partner software 271 over the Internet 108. The signal comprises the VoIP user ID and any other relevant user credentials for the VoIP system. In response to receiving this signal the partner software 271 passes the credentials to the partner instance 222' (e.g. via the OS 270) and controls it to set up a communication connection over the Internet 108 with the VoIP client of the appropriate callee. This could be achieved for example by launching a new instance 222' of the client application for each caller initiating communications in this manner, or by providing a special partner instance 222' of the client that can handle multiple calling users, or indeed by a combination of these two techniques. In the case of a partner instance 222' that can handle multiple users, the user credentials may be used to create different user sessions or entities within that instance.

Alternatively in response to the user interaction, the browser 221 running on the caller's terminal 102 signals to one of the VoIP client instances 222" or 222''' running on one of the user's terminals 102 that is configured to access VoIP via the partner system 105, and the VoIP client instance 222" or 222''' signals to the partner software 271 over the Internet 108.

Considering the situation from the other perspective, other users such as Sally may initiate communications with the first user (Joe) of the first terminal 102(A), either by running her own local instance of the VoIP client application on her own user terminal 102(E) or by accessing a partner instance of the VoIP client on a partner server 105 and providing it with her own user credentials. Even if the other user is not a registered user of the VoIP system it may be allowed that they access the VoIP system using a partner instance on a partner server 105 by creating temporary or partner-specific VoIP user credentials (e.g. at least a user ID for the VoIP system, and any other required credentials such as an authentication certificate and/or password).

As mentioned, the first user, Joe, may have multiple instances of the client application available for use, and may be running any one of them at any one time. For example the user may have the main instance 222 installed on a home user terminal 102(A), a partner instance 222' hosted on a partner server 105, another local instance 222" on a work user terminal 102(F), and/or another instance installed on the same user terminal 102(A) as the main instance. Depending on which instance the first user is using at any one time, i.e. which is currently being executed, then any requests to establish a VoIP communication connection from any other user will be delivered to the instance on appropriate terminal 102(A), 105 or 102(F) respectively. The instance currently in use could also be thought of as the "active" instance. Delivery of the request to the appropriate destination could be achieved for example by the having the active instance update the look-up address at the appropriate node of the distributed address look-up scheme. If multiple instances are being executed at any one time, then rules could be provided to determine which one takes precedence and is considered "active". E.g. whichever is run in an active window, or whichever is not being run only in the background or system tray.

Note that when one or both users are accessing the VoIP communication system using a partner instance on a partner server 105, that does not mean the actual media stream has to be routed via the partner server 105 (although that possibility is not excluded). Rather, the involvement is primarily for initiating call or connection set-up, and once the connection is established between two user terminals such as 102(A) and 102(E) then the actual voice or video, etc. may be routed directly across the Internet 108 between them.

Figure 4B:
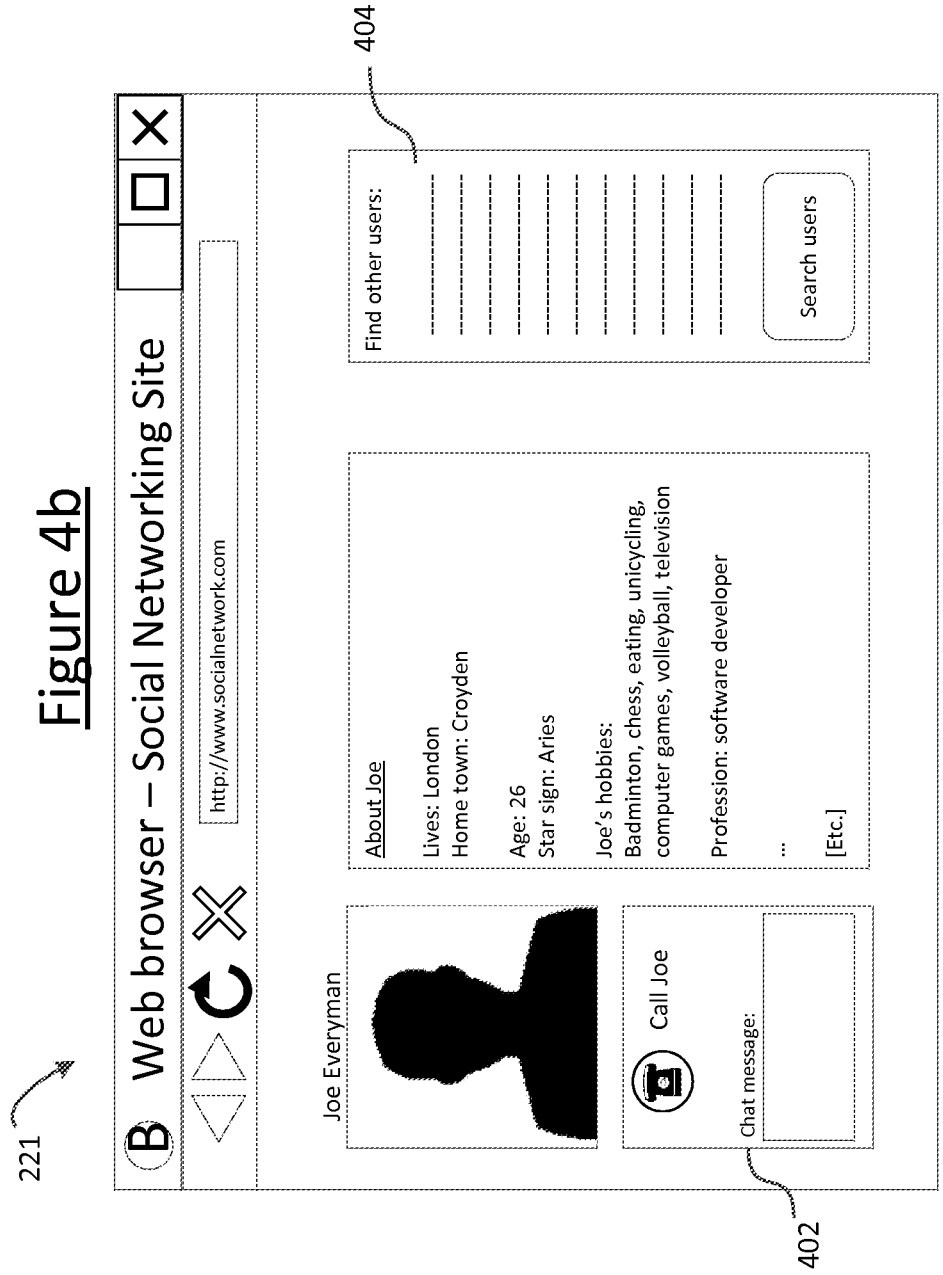
FIG. 4b is a further representation of a partner system user interface viewed through a web client application on a user terminal.

FIG. 4b shows a schematic example of a user interface of the partner system as viewed on Sally's user terminal 102(E). If the first user Joe is a user of both the VoIP system and the partner system, then she is able to view Joe's profile within the partner system (e.g. his social networking profile, not necessarily the same as his profile within the VoIP system) and is presented with control communications to be initiated with Joe's terminal 102(A) or 102(F) by means of a partner instance on partner server 105. The partner system user interface may also include a control 404 allowing users to search for other users of the partner system, e.g. searching by user ID of the VoIP system or searching by other information such as common interests, aims or location which may affect whether the users would like to get in touch.

For a communication system such as a VoIP system then the user typically only accepts other users as contacts if they are known or trusted. However, the inventors have recognised that for certain partner systems the user may not already have a trusted circle of contacts. For example, if the partner system is a social networking or dating site then the whole idea of using the partner system may be to meet new people, but at the same time the user may require stricter privacy settings when doing so than for the existing VoIP system. It would therefore be desirable to provide a mechanism whereby suitable privacy can be maintained even when integrating the VoIP system with a partner system.

In another example, some partner systems may be more trusted than others. E.g. in a conventional social network the user may only accept known contacts as friends, in which case it may be acceptable to integrate the contacts of that partner system into the VoIP client without the need for additional privacy; but some other types of social network such as those designed for dating may be less trusted by the user and therefore require stricter privacy settings.

Other examples of partner systems where privacy may be an issue could include sites providing classified or personal adverts, a public forum, or a business related system in which the user doesn't want to allow the same level of intimacy as would be afforded in a non-business environment.

Further, regardless of the issue of partner systems, a user may require a different level of privacy depending on whether at home or at work, or whether at home or out-and-about using a mobile terminal.

In order to address the above concerns, embodiments provide a plurality of different instances of the same user's client application, and maintain different privacy settings depending on which of the different instances of that same user's client application is currently active. Thus the user is able to maintain a different level of privacy depending on the environment or circumstances in which he or she is operating. For example, if online via a partner instance of the client 222' then the user may desire a greater degree of privacy than if online via the main instance 222, or if online on a work user terminal then the user may desire a greater degree of privacy than if online on a home user terminal.

Note that different instances refer specifically to instances of the same user. Even in the case where one of the instances is a partner instance run on a partner server 105, then when operating as such the partner instance can still be said to be an instance of that same user's client application in that it has been instantiated with that user's ID and potentially other such credentials so as to be able to represent that user or act on behalf of that user in initiating and accepting communication connections. But the communication clients installed on user terminals 102(A) and 102(E) are not different instances of the same client because they represent or act on behalf of different users. The instances of a given user's client may be considered to be characterised by the user ID or similar.

An example user interface of the VoIP client for controlling privacy settings is shown schematically in FIG. 5. Any or all of such privacy settings could be provided in different embodiments, or indeed other privacy settings.

In one embodiment, the different privacy settings for the different instances could each be stored locally at storage devices of the respective terminals, e.g. separate privacy settings stored at terminals 102(A), 102(F) and 105 for the respective instances. However, that embodiment may only allow for control of the privacy settings for a particular instance when running that instance—e.g. if the user was using the home user terminal 102(A) and the work terminal 105(F) was turned off, then it may not be possible for the user to control the privacy settings of the work instance remotely.

Instead, in embodiments the privacy settings for some or all of a user's instances are stored on a server such as the VoIP provider's server 104. This could allow control of privacy settings for all instances to be controlled remotely via the Internet 108 regardless of the instance being used at the time—e.g. the client user interface may be operable to open a separate window such as in FIG. 5 for each instance or type of instance, or the same window could include separate controls for each instance or type of instance.

Referring again to FIG. 2c, to achieve this embodiment each instance of a given user's communication client may be provided with an additional identifier or parameter referred to herein as a "token", in addition to the user ID. The token distinguishes between different types of client instance, or different groups of client instances, or even to identify individual client instances amongst the multiple instances of a given user. For example, the token may identify whether the instance is a partner instance or a regular "main" instance of the VoIP client. Alternatively the token could comprise an identifier to identify the particular instance amongst those of a given user, in which case the combination of user ID and token ID together would be unique within the communication system in question. When the user runs a particular instance of his or her client on the corresponding terminal 102 or 105, that instant transmits its token and user ID to the VoIP provider's server 104 via the Internet 108 (or if a token ID was made unique in itself then only the token ID need be transmitted). In response to receiving this, the VoIP server 104 is configured to then look-up the token for that user in a look-up table 199 stored at that server, and thus retrieve the relevant privacy settings for the requesting instance. The VoIP provider's server 104 then returns the required privacy settings to that instant on the corresponding terminal 102 or 105.

In embodiments, the privacy settings allow the first user is at least able to determine what communication medium other users can contact them by depending on the instance the first user is currently using, e.g. by voice, video or IM message. For example, referring to FIG. 4c, Sally may have used the search tool 404 to determine that she has certain interests in common with Joe and therefore wishes to contact him to suggest a social engagement. However, Joe may be concerned that users who contact him whilst he is using the partner system instead of the main VoIP client instance 222 could potentially be less trustworthy or may wish to maintain a certain distance until better acquainted, and so may desire to keep a greater degree of privacy in such an environment. In that case he can set his privacy settings such that when he is online using the partner instance 222', 222'' or 222''' then he can only be contacted by, say, IM chat message; but when online using the main instance 222 then he can be contacted by video or voice call as well. Therefore if Sally meets Joe in the environment of the partner social networking site, she is only able to contact him by IM chat message appearing in a chat bar provided as part of the inserted VoIP controls 402, as illustrated in FIG. 4c. If she attempts to initiate a voice call, the partner instance 222', 222'' or 222''' will refuse the connection set-up request based on the privacy settings it has retrieved for that instance.

Of course if Sally knows Joe's user ID for the VoIP communication system, she will still be able to contact him by voice or video call when he is online via the main instance 222. However, depending on the embodiment, this ID could be hidden from her in the environment of the partner system, at least until Joe decided to share such details.

In another example, the privacy settings could allow the user to enable or disable whether they can contacted at all depending on the instance.

In a further example, the privacy settings could allow the user to control how he is seen depending on the instance he is using. For example, the user may not want other users to see his presence status or certain parts of his VoIP system profile when he using the partner instance, e.g. if using an instance hosted by a dating site. In the case of limiting presence information, if this is shared directly between the clients of user terminals 102 then the privacy settings may be retrieved by the active instance 222', 222'' or 222''' from the VoIP provider's server 104 as described above, and the instance 222', 222'' or 222''' then blocks or ignores requests for presence information from other clients based on those privacy settings in a similar manner to rejecting requests connection set-up as described above. However, in the case of limiting the VoIP profile information made available (not the necessarily the same as the profile maintained in relation to the partner system, e.g. the social networking profile), then that information may be maintained centrally at the VoIP server 104. In that case, the active instance 222', 222'' or 222''' may send a message to the VoIP server 104 to flag certain profile information as on or off limits.

In another embodiment, a user's VoIP contact list can be partitioned into two or more different groups and different privacy settings can be maintained for each of those different groups. Referring again to FIG. 2c, the VoIP contact list 198 (as opposed to the partner contact list which may only be partially coincident) may be maintained at the VoIP provider's server 104. When a particular instance of a user's client is run on a terminal 102 or 105, it retrieves the contact list from the P2P server 104 via the Internet 108, and when contacts are updated then the client instance uploads the updated contact information to the VoIP server 104 via the Internet 108. In a similar manner, the instance of the client running on terminal 102 or 105 may also retrieve from the VoIP server 104 an indication of which contacts are in which groups and retrieve the privacy settings for the different groups, and may send messages to the P2P server 104 to update which users are in which groups and to update the privacy settings for those groups.

In embodiments only one VoIP contact list 198 need be maintained at the VoIP provider's server 104 and the different contact groups can be achieved by associating a flag or parameter with each contact within the list specifying the respective contact as being as allocated to a particular one of the groups, e.g. X or Y.

In a particular embodiment, the contact groups of the first user may be determined at least partially automatically in dependence on the environment in which the contact was first encountered.

For example, the initial grouping of a contact could be determined automatically in dependence which instance the contact was using when first encountered. If the first user receives a request from another user to be accepted as a contact within the VoIP system (as opposed to a contact within the partner system), and that request is received from a partner instance run on the partner server 105, then, if accepted, the first user's client may place the contact automatically in a group X having stricter privacy settings (e.g. can only contact the first user by IM chat and not voice or video call). But if the request is received from a main instance run on a user terminal 102, it may be automatically placed in a less strict group Y. The type of instance originating the request can be determined by the token, which may be transmitted with a contact request.

From the other perspective, if the first user requests to become a contact of the other user while the other user is using a partner instance (e.g. run on the partner server 105), then the other user may be placed automatically in the stricter group X. But if the first user requests to become a contact of the other user while the other user is running a main instance on a user terminal 102, then the other user may be placed automatically in the less strict group Y. The type of instance the other user is using may be determined from the token retrieved in response to the contact request from the first user.

Alternatively or additionally, the initial grouping of a contact could be determined automatically in dependence which instance the first user themselves was using when the other user was first encountered. That is, in dependence on the instance the first user was running when receiving a contact request from the other user or when sending a contact request to the other user. So if the first user uses the partner instance 222' to requests to become a contact of the other user then the other user may be automatically placed in the stricter group X, but if the first user sends the contact request from the main instance 222 then the contact is placed in the less strict group Y.

After the initial automated grouping, the first user may have the option of re-assigning users to other groups manually. In this sense the grouping may only be partially automatic.

The feature of maintaining different privacy settings for different groups may be used either in addition to or as an alternative to the feature of maintaining different privacy settings for different client instances. In the case that both features are used together, the privacy look-up table 199 may therefore contain multiple entries per privacy setting per token, e.g. one for each group X or Y.

It will be appreciated that the above embodiments are described only by way of example.

For instance, although a peer-to-peer (P2P) system has been mentioned as one possible topology, this disclosure is not specific to P2P and may be applied to any kind of packet-based communications system, such as the more centralised VoIP systems discussed previously. Further, the disclosure is not limited to use over the Internet, but could be implemented over any packet-based network. Further, although the above has been described in terms of a exemplary types of partner system such as a social networking site, other types of partner system operating over the packet-based network in conjunction with the P2P, VoIP or other such communication systems are possible.

Further, note that the term "application" as used herein need not necessarily refer to any particular discrete unit of software such as a single or separately executable program. Any functionality described above as a particular application could comprise one or more distinct or independently operable portions of code. For example, although in embodiments the document browser and communication client are separately executable applications, they need not necessarily be.

Further, note that whilst reference may have been made above to a components such as a memory or processor of a user terminal 102, a server 104 or 105 of the packet-based network, or gateway 106 between the packet-based network and telephone network, generally these terms need not necessarily refer to single or indivisible units—e.g. a memory or storage medium or device may comprise one or more memory types such as flash memory and hard-drive, etc. and/or one or more physically separated memory modules; a processor of a user terminal may comprise multiple cores or execution units; a server may comprise a number of constituent server units potentially at different sites distributed across a network; and a gateway may comprise a number of gateway units distributed across a network.

Further, the present disclosure is not limited to using any particular control means to maintain and control the privacy settings. Most generally, the control means can be implemented in the form of any suitable control. In embodiments the control device is implemented as suitable code and look-up table(s) on a server of the packet-based network, e.g. the server 104. But as mentioned, an alternative control device may be implemented in the form of suitable code and separate privacy settings on the different terminals of each respective instance, e.g. implemented in part on a user terminal 102 and in part on a partner server 105. In yet further embodiments, some or all of the privacy control device could even be implemented in dedicated hardware provided on individual user or partner terminals or accessible via another node of the packet-based network.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A communication system comprising:
one or more terminals coupled to a packet-based network, installed with a first instance of a communication client application of a first user and a second instance of the communication client application of said first user, the communication client application being configured so as, responsive to execution by at least one processor, to enable the first user to communicate with other users via a first communication system implemented over the packet-based network; and
a controller coupled to the packet-based network and configured to:
store, at a data storage unit local to the controller, separate privacy settings for each of the first and second instances effective to enable maintaining different privacy settings for each of the first and second instances; and
control the privacy of the first user in relation to said other users within the first communication system in dependence on which of the first and second instances is active and the respective privacy setting of said active instance.

2. The communication system of claim 1, further comprising a first one of said terminals and a second one of said terminals, the first instance of the client application being installed on the first terminal and the second instance of the client application being installed on the second terminal.

3. The communication system of claim 1, wherein the first and second instances of the communication client application are installed on a same terminal of said terminals.

4. The communication system of claim 1, further configured to:
receive an identifier of which instance of the first instance and second instance is currently active, the first instance is associated with a first identifier, the second instance is associated with a second identifier;
map the received identifier to the corresponding privacy settings; and
control said privacy in dependence on the mapped settings.

5. The communication system of claim 2, wherein the controller further comprises a respective data storage unit on each of the first and second terminals, thus providing local privacy settings for each of the first and second instances.

6. The communication system of claim 1, further comprising one or more second servers configured to operate a partner communication system implemented over the packet-based network, the partner communication system providing an additional communication medium in conjunction with the first packet-based communication system, wherein said second instance of the client application is associated with the partner communication system.

7. The communication system of claim 6, comprising a first terminal of said terminals and a second terminal of said terminals, the first instance of the client application being installed on the first terminal and the second instance of the client application being installed on the second terminal;
wherein said one or more second servers comprise at least said second terminal, such that the second terminal is configured to provide access to the first communication system via the partner communication system.

8. The communication system of claim 1, wherein each of the first and second instances is configured so as, responsive to execution, to enable the first user to communicate with the other users via any of a plurality of different communication media, and the privacy settings determine which of the plurality of communication media the other users can use to contact the first user.

9. The communication system of claim 1, wherein the privacy settings determine whether or not the other users can contact the first user.

10. The communication system of claim 1, wherein the privacy settings determine what information about the first user is made available to the other users.

11. The communication system of claim 1, wherein:
the controller is further configured to maintain separate privacy settings for the first user in relation to each of a first and second group of contacts from amongst said other users, and thereby control the privacy of the first user in relation to said other users within the first communication system in dependence on the group of the other user.

12. The communication system of claim 11, further comprising one or more second servers configured to operate a partner communication system implemented over the packet-based network, the partner communication system providing an additional communication medium in conjunction with the first packet-based communication system, wherein the controller is configured to automatically determine the group of a contact in dependence on whether initially encountered via the partner communication system.

13. A method implemented by a server, the method comprising:
providing, using the server, a first instance of a communication client application to a terminal of a packet-based network for use by a first user, the communication client application being configured so as, responsive to execution, to enable the first user to communicate with other users via a first communication system implemented over the packet-based network, the first instance of the communication client application associated with a first set of privacy settings;
providing, using the server, a second instance of the communication client application to a terminal of a packet-based network for use by said first user, the second instance of the communication client application associated with a second set of privacy settings; and
storing, at the server, the first set of privacy settings and the second set of privacy settings separately effective to:
maintain, with the server, different privacy settings for the first instance and the second instance;
control the privacy of the first user in accordance with the first set of privacy settings each time the first instance is active; and
control the privacy of the first user in accordance with the second set of privacy settings each time the second instance is active.

14. The method of claim 13, wherein the first instance of the client application is installed on a first terminal and the second instance of the client application is installed on a second terminal.

15. The method of claim 13, wherein the first and second instances of the communication client application are installed on a same terminal.

16. The method of claim 13 further comprising:
receiving an identifier of which instance of the first instance and the second instance is currently active, the first instance associated with a first identifier, the second instance associated with a second identifier;
mapping the received identifier to the corresponding privacy settings stored by the computer; and
controlling said privacy in dependence on the mapped settings.

17. The method of claim 14, wherein a respective data storage unit on each of the first and second terminals is used to provide local privacy settings for each of the first and second instances.

18. The method of claim 13, wherein one or more second servers operate a partner communication system implemented over the packet-based network, the partner communication system providing an additional communication medium in conjunction with the first packet-based communication system, and wherein said second instance of the client application is associated with the partner communication system.

19. The method of claim 18, wherein the first instance of the client application is installed on a first terminal and the second instance of the client application is installed on a second terminal; and
wherein said one or more second servers comprise at least said second terminal, and the second terminal is used to provide access to the first communication system via the partner communication system.

20. A system comprising:
at least one processor; and
one or more computer-readable storage medium devices comprising processor-executable instructions configured so as, responsive to execution by the at least one processor, to:
provide a first instance of a communication client application, associated with a user, to first user terminal of a packet-based network, the communication client application configured so as, responsive to execution on the first user terminal, to enable the user to communicate, via the first instance of the communication client application, with other users over the packet-based network;

provide a second instance of the communication client application, associated with the user, to a second user terminal of the packet-based network for use by said user, the communication client application configured so as, responsive to execution on the second user terminal, to enable the user to communicate, via the second instance of the communication client application, with other users over the packet-based network; and store, at the system, separate privacy settings for each of the first instance and second instance effective to:

maintain, at the system, different privacy settings for each of the first instance and second instance;

control the privacy of the user in accordance with the separate privacy settings for the first instance in relation to said other users each time the first instance is active; and control the privacy of the user in accordance with the separate privacy settings for the second instance in relation to said other users each time the second instance is active.

\* \* \* \* \*